United States Patent [19]
Robertson

[11] 3,715,146
[45] Feb. 6, 1973

[54] SNOW CLEAT AND TRACK FOR TRACKED VEHICLE

[76] Inventor: William Lauchlin Robertson, 7024 Kenosie Place, Calgary, Alberta, Canada

[22] Filed: Jan. 15, 1971

[21] Appl. No.: 106,668

[30] Foreign Application Priority Data

Jan. 19, 1970 Canada..................................072495

[52] U.S. Cl...............................305/35 EB, 305/54
[51] Int. Cl. .......................................B62d 55/28
[58] Field of Search.............305/35 EB, 38, 54, 55; 301/44 B

[56] References Cited

UNITED STATES PATENTS

| | | | |
|---|---|---|---|
| 1,820,743 | 8/1931 | Honstain | 301/44 B X |
| 3,572,851 | 3/1971 | Schuler | 305/54 |
| 2,419,522 | 4/1947 | Acton | 180/5 R |
| 3,550,968 | 12/1970 | Rymes | 305/35 EB |
| 3,165,364 | 1/1965 | Hardman | 305/35 EB X |

OTHER PUBLICATIONS

German printed App. No. 1,085,780–Porsche 7-1960

Primary Examiner—Richard J. Johnson
Attorney—Christen & Sabol

[57] ABSTRACT

A snow cleat and a track particularly adapted for use in deep snow. A track wherein snow cleats are arranged to provide greater spacings longitudinally of the track adjacent each edge of the track than centrally thereof to increase the shear strength of the supporting snow. The snow cleat may comprise two traction blade portions of different lengths defining a traction blade which is unsymmetrically arranged lengthwise of a supporting base, and an ice cleat mounted intermediate said traction blade portions. The snow track may also comprise snow blades extending the full width of the track and separating a limited number of snow cleats having traction blades positioned in staggered relation to each other transversely of the track.

21 Claims, 3 Drawing Figures

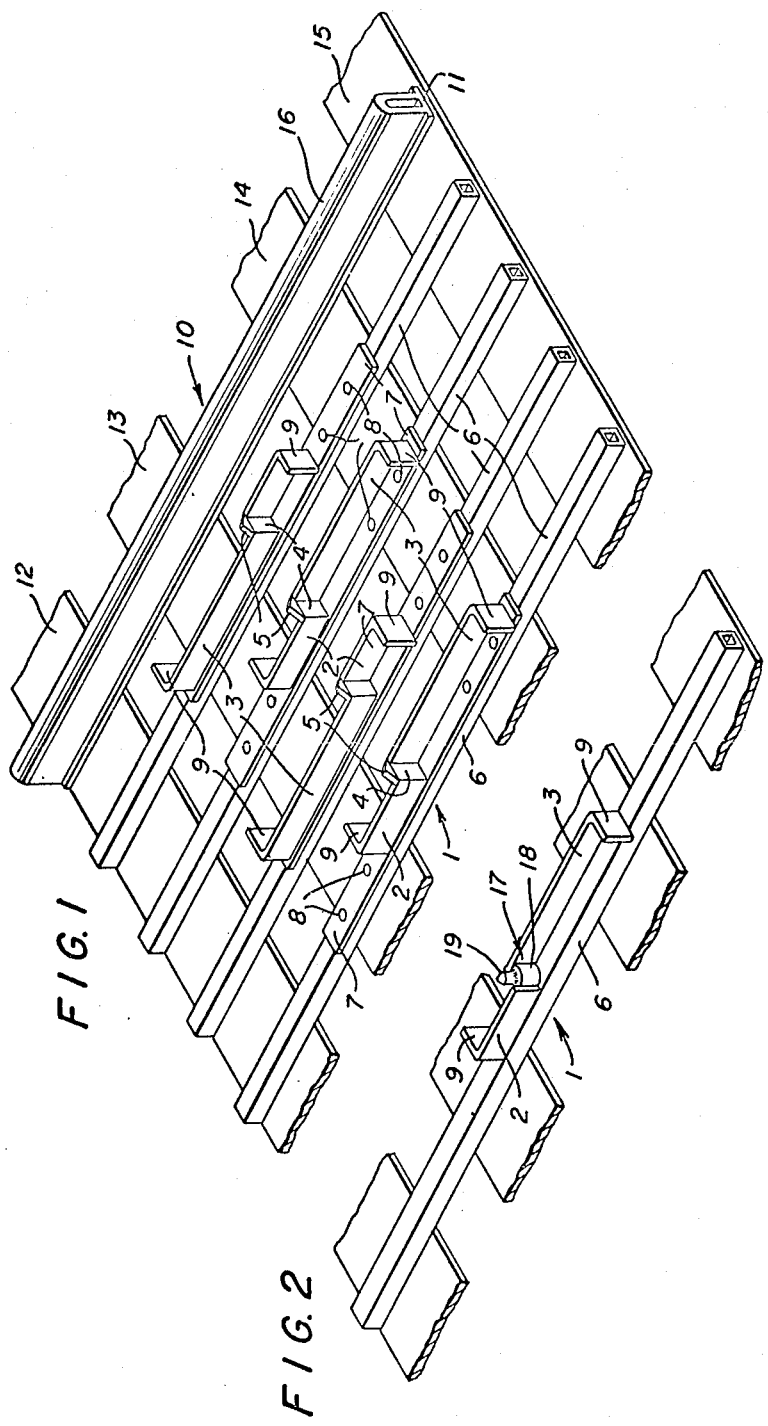

SNOW CLEAT AND TRACK FOR TRACKED VEHICLE

This invention relates to tracked vehicles and more particularly to a snow cleat and a track for a tracked vehicle to be used in deep snow.

It is known that the traction of a tracked vehicle in deep snow is related to the shear strength of the snow and the area of undisturbed snow under the tracks. In turn, the shear strength is related to the compaction of the snow. Up to now, the tracks specifically made for use in deep snow have been made with grouser bars or snow cleats having snow blades extending the full width of the track. It has been observed that with all the snow blades extending the full width of the track, the spacing between the blades is such that most of the snow is disturbed, resulting in lower shear strength and consequent loss of traction.

It is a general object of the invention to provide a snow cleat and a track for a tracked vehicle which will reduce snow disturbance thus increasing shearing strength of the supporting snow. It is another object of the invention to provide a track which has resistance to sideslip when side hilling, which provides traction on hard, icy snow and which does not produce ruts which might endanger skiers.

One form of snow cleat according to the invention comprises an elongated base, a traction blade fixed to and extending longitudinally of said base, said traction blade being shorter than said base and being located extending generally unsymmetrically lengthwise of said base so as to have its ends at different distances from the ends of said elongated base. Preferably the traction blade is of one piece construction having blade portions of different lengths with relation to a centrally located ice cleat and extending in substantially opposite directions from said ice cleat toward the ends of the elongated base, the outer end of the shorter traction blade portion is at a greater distance from one end of the elongated base than the other end of the longer traction blade portion is from the other end of the elongated base and said ice cleat is defined by an intermediate blade portion forming part of said traction blade.

The snow cleat of the invention may comprise an elongated base, and a one piece traction blade, an ice cleat defined by a built up portion formed onto said one piece blade, and a traction point of hard facing material located at one end of said built up portion and pointing away from said elongated base.

The invention also provides a snow track comprising at least one flexible elongated element, snow cleats having traction blades fixed to said flexible elongated element and extending transversely thereof, the dimension of the traction blades transverse of said elongated element being shorter than the width of the snow track and said traction blades being arranged in staggered relationship transversely of said elongated element thereby defining spaces between the traction blades lengthwise of the elongated element which are greater than the spacing between any pair of successive snow cleats.

The invention will now be described, by way of example only, with reference to the embodiments shown in the accompanying drawing, in which:

FIG. 1 is a perspective view of part of a preferred embodiment of a snow track construction in accordance with the teachings of this invention.

FIG. 2 is a perspective view of a second embodiment of the invention.

Figure 3:
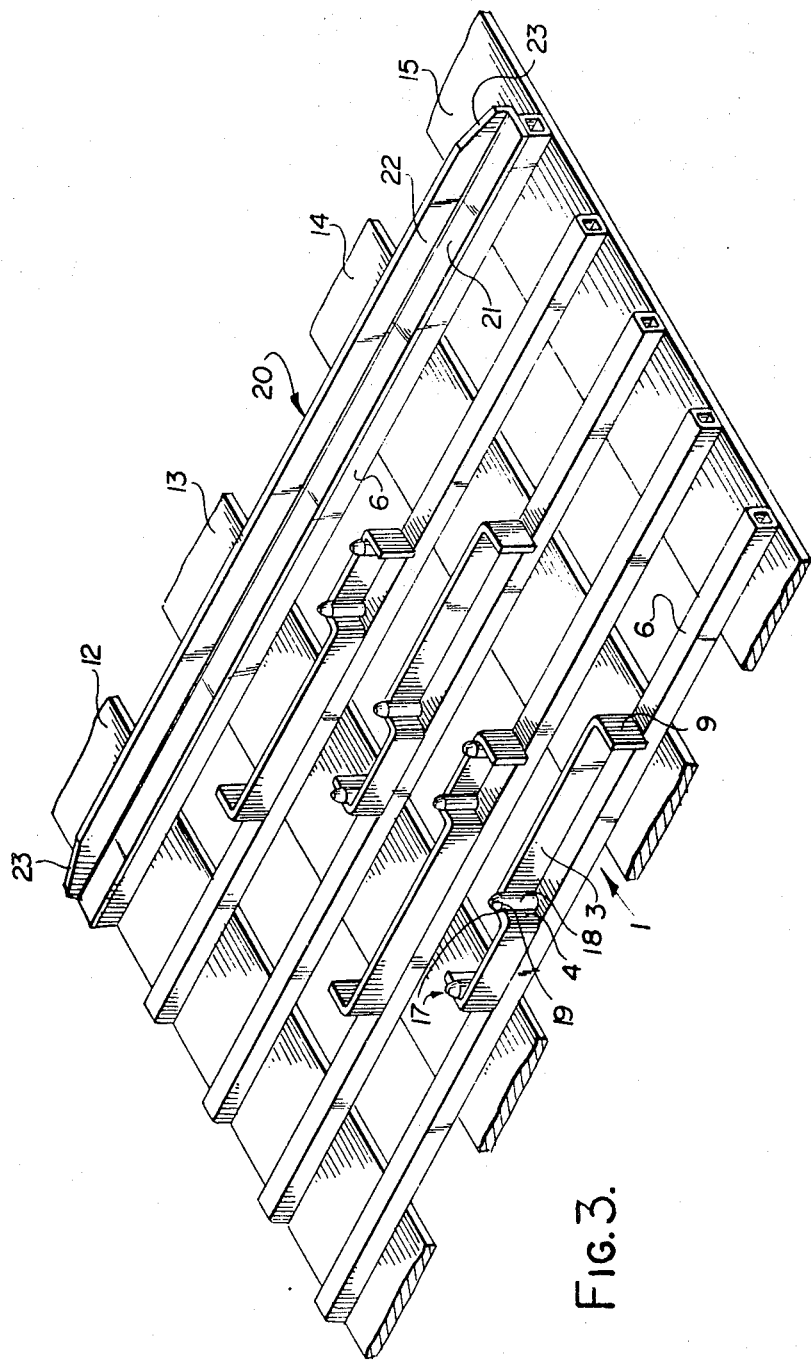
FIG. 3 is a perspective view of a track section illustrating a third embodiment of the invention.

In the two embodiments of the invention, shown in FIGS. 1 and 2, a snow cleat 1 has a traction blade portion 3 and an overall length which is shorter than the full width of the track.

In the preferred embodiment of the invention, shown in FIG. 1, the snow cleat 1 comprises an ice cleat defined by a built up portion or post formed by a transverse intermediate blade portion 4 extending transversely of the traction blade portions 2 and 3, and a traction point 5 which is built up from a suitable hard facing material forming an efficient traction element on ice or icy surfaces. The traction point 5 may be formed integrally with the transverse blade portion 4 or, as illustrated in FIG. 1, may be a separate flat piece having a base fixed endwise on the free edge of the transverse blade portion 4.

A crossbar 6 forms a rigid elongated base for the blade portions 2, 3 and 4 and extends transversely of the track from one edge to the other thereof. The crossbar 6 may be of various cross sections but, as shown in the drawing, a tubular bar having a square or rectangular cross section is preferred so as to provide a plane surface and a pair of parallel edges for mounting the blade portions 2, 3 and 4.

The traction blade portions 2 and 3 and the transverse blade portion 4 are formed from a single continuous strip of metal having one side edge fixed edgewise, as by welding or otherwise either directly on the above mentioned plane surface of the crossbar 6 or on one face of a baseplate 7. The latter is fixed on the above mentioned plane surface of the crossbar 6 by bolts 8 or other well known and suitable expedient.

The short traction blade portion 2 extends along one edge of the crossbar 6. The outer end of the traction blade portion 2 is bent at a substantially 90° angle to form a side thrust plate portion 9. Similarly, the long traction blade portion 3 extends from the transverse blade portion 4 on the opposite side thereof relative to the blade portion 2 and extends along the other edge of the crossbar 6. That is, when the short traction blade portion 2 extends along the front edge of the crossbar 6, the long traction blade portion 3 extends along the rear edge of the crossbar 6 and vice versa. The other end of the long traction blade portion 3 is also bent at a substantially 90° angle to also form a side thrust plate portion 9.

The traction points 5 are located centrally of their associated crossbars 6 and, as shown in FIG. 1, the long traction blade portions 3 on two adjacent crossbars 6 extend in opposite directions relative to their associated traction point to provide a staggered relationship of the traction blades. Thus there are formed 'block areas' defining spaces between adjacent snow blades which are greater than the spacing between any pair of successive snow cleats whereby, in use of the track in deep snow, there is less snow disturbance resulting in an increase in shear strength of the snow, and hence the traction available.

A snowblade 10 comprises a hollow extrusion of, for example aluminum, defining a base portion 11 adapted to rest and be fixed to flexible elongated elements in the form of belts 12, 13, 14 and 15. The snow blade 10 extends transversely of the belts 12–15 across the full width of the track. The tractive part of the snow blade 10 is defined by a traction blade portion 16 extending in substantially the same direction as the short and long traction blade portions 2 and 3 relative to the belts 12, 13, 14 and 15. On the inner side of the track defined by the belts, that is, on the side opposite from the snow cleats 1 and snow blades 10, wheel guides, not shown, are provided to span the central gap defined between the belts 13 and 14. Plates, not shown, are also provided on the inner side of the belt and in association with the belts 12 and 15 in cooperation with the crossbars 6 and the base portions 11 to firmly attach the latter to the belt in a manner well known in the art. Since the wheel guides and the plates on the inner side of the track do not form part of the invention, they have not been illustrated in order to simplify the drawing.

In the second embodiment of the invention shown in FIG. 2, the snow cleat comprises a pair of traction blade portions 2 and 3 of unequal lengths as in FIG. 1 separated from each other by an ice cleat 17 of different construction than the traction point 5. The ice cleat 17 in FIG. 2 forms a post or stud having a portion 18 of substantially cylindrical configuration and an end portion 19 which is pointed and hardened in any well known manner and made of any suitable material to form a traction point that constitutes an efficient traction element on ice or icy surfaces. The cylindrical portion 18 is fixed endwise by a transverse surface on the crossbar 6. The inner ends of the traction blade portions 2 and 3 are preferably welded at diametrically opposite points of the cylindrical portion 18 or otherwise rigidly fixed or joined to the latter.

In the two previous embodiments of the invention, only one ice cleat has been provided for each snow cleat, either as a built up element fixed onto an intermediate traction blade portion of the snow cleat or as a post or stud fixed endwise on a base intermediate two separate traction blade portions of unequal lengths. Also, in the previous embodiments the full width snow blade has been defined as being formed of aluminum.

Some changes to the abovementioned two embodiments result in a third embodiment. The latter combines the one-piece traction blade of the first embodiment with a pair of separate ice cleat posts or studs substantially constructed as defined in relation to the second embodiment. The third embodiment further proposes a full width snow blade of welded steel construction.

As in the case of the first embodiment illustrated in FIG. 1, the third embodiment comprises a snow cleat 1 having a traction blade made of one piece construction defining a short traction blade portion 2, a long traction blade portion 3, an intermediate portion 4, and a pair of side thrust plate portions 9 at the opposite ends of the traction blade. A pair of ice cleats 17 are provided in association with each traction blade. As for the second embodiment shown in FIG. 2, the ice cleat 17 forms a stud or post having a cylindrical portion 18 fixed endwise by a transverse surface on a crossbar 6.

The ice cleat 17 also has an end portion 19 which is pointed and hardened to form a traction point. One ice cleat 17 is mounted relatively centrally with respect to the length of the crossbar 6, against the intermediate blade portion 4. Preferably, the centrally mounted ice cleat 17 is located in the corner defined by the intermediate portion 4 and the short or the long traction blade portion 2 or 3 respectively. The other ice cleat 17 of the abovementioned pair of ice cleats is mounted at the free end of the shorter traction blade portion 2, and preferably in the corner defined by the shorter traction blade portion 2 and the associated side thrust plate portion 9. As can be seen in FIG. 3, this arrangement of the ice cleats 17 produces a relatively centrally located row of ice cleats 17 extending longitudinally of the vehicle track and a staggered relationship of the other ice cleats relative to the centrally located row. Obviously, if desired, other ice cleats could be added to the ones above defined, for instance, in the corner defined by the longer traction blade portion 3 and a side thrust plate portion 9.

The third embodiment also includes a snow blade 20 of welded steel construction. As shown in FIG. 3, the snow blade 20 comprises an angle piece of steel extending the full width of the track. One flange 21 of the angle piece is welded or otherwise attached on a crossbar 6 while the other flange 22 thereof extends away from the crossbar 6 and the belts 12–15. The opposite ends of the flange 22 are trimmed at the corners 23 as by cutting or otherwise. The blade 20 need not be made necessarily of steel and other appropriate metals or alloys could be used.

It must be pointed out that although the drawings shows four belts 12, 13, 14 and 15, a different number of belts or other flexible elongated elements, such as chains, could be used. Also, it must be understood that only a portion of a track is illustrated and a complete endless track comprises a series of spaced snow blades 10, with the snow cleats 1 of each group being alternatively turned at 180° end to end relative to the adjacent snow cleats to form a staggered arrangement as shown. It should be appreciated that the number of snow cleats 1 between every two successive snow blades 10 is preferably an even number such that there is the same number of short traction blade portions 2 and of long traction blade portions 3 on both sides of the centrally positioned row of traction points 5 or ice cleats 17.

The short traction blade portion 2 and the long traction blade portion 3 need not necessarily be fixed to the transverse blade portion 4 or to the cylindrical portion 18. The traction blade portions 2 and 3 may be fixed only to the crossbar 6 or the base plate 7 while the inner ends of said traction blade portions 2 and 3 are spaced from the ice cleat 17 or merely touch the latter.

The embodiments of the invention in which an exclusive property or privilege is claimed are defined as follows:

1. A snow cleat for a tracked vehicle comprising an elongated base, and a single traction blade fixed to and extending longitudinally of said base along the central portion thereof, said traction blade being shorter than said base and being located extending generally unsymmetrically lengthwise of said base and having opposite ends spaced at different distances from the ends of said elongated base, said traction blade comprises a pair of traction blade portions of different lengths each having one end positioned centrally intermediate the ends of the elongated base, and said two traction blade portions extend in opposite directions from said one ends toward the ends of the elongated base whereby the other end of the shorter traction blade portion is at a greater distance from one end of the elongated base than the other end of the larger traction blade portion is from the other end of the elongated base.

2. A snow cleat as defined in claim 1, wherein an ice cleat is fixedly mounted relative to said elongated base.

3. A snow cleat as defined in claim 2, wherein said traction blade is of one piece construction and said ice cleat includes an intermediate blade portion forming part of said traction blade between said shorter traction blade portion and said longer traction blade portion.

4. A snow cleat as defined in claim 3, wherein a traction point made of hard facing material is fixed to said intermediate blade portion and points away therefrom such as to define therewith said ice cleat.

5. A snow cleat as defined in claim 2, wherein said ice cleat is defined by a post fixed to said base relatively centrally intermediate the ends thereof and extending away therefrom with one end of said post pointing away from said base, said traction blade is of one piece construction defining an intermediate traction blade portion joining said shorter traction blade portion to said longer traction blade portion, said intermediate traction blade portion extends transversely of said elongated base and forms angles with said shorter traction blade portion and said longer traction blade portion, and said post is located in the corner defined by one of said angles.

6. A snow cleat as defined in claim 5, wherein said traction blade has a side thrust plate portion extending transversely of said elongated base at the outer end of said shorter traction blade portion at an angle with the latter, an ice cleat is located in a corner defined by said angle between said shorter traction blade portion and said side thrust plate portion, the latter ice cleat is defined by a post fixed to said base and extending away therefrom with one end of the latter post pointing away from said base.

7. A snow cleat for a tracked vehicle comprising a rigid elongated base, an ice cleat defined by a post jointed into endwise abutment with said base at substantially the mid-length intermediate the ends thereof and extending away therefrom with one end of said post pointing away from said base and a pair of traction blade portions fixed into edgewise engagement with said base and extending at different distances and in opposite directions away from said post towards the ends of the base.

8. A snow cleat as defined in claim 7, wherein said post and said traction blade portions are of one piece construction.

9. A snow cleat as defined in claim 7, wherein said two traction blade portions are of different lengths.

10. A snow cleat as defined in claim 9, wherein said post is a stud having a cylindrical periphery and wherein one end of the shorter traction blade portion and one end of the longer traction blade portion are fixed respectively on opposite sides of the periphery of the stud substantially tangentially thereto.

11. A snow cleat as defined in claim 10, wherein said base is constituted by a bar having a plane surface with a pair of parallel edges and said shorter traction blade portion and said longer traction blade portion extend one along each of said edges.

12. A snow cleat as defined in claim 10, wherein the other end of the shorter traction blade portion and the other end of the longer traction blade portion are each provided with a side thrust plate arranged at an angle relative to the traction blade portions.

13. A snow cleat as defined in claim 7, wherein said one end of the post is hardened and pointed to form a traction point.

14. A snow track for a tracked vehicle having at least one flexible elongated element and snow cleats fixed transversely to said flexible elongated element, each said snow cleat comprising a base, an ice cleat defined by a post fixed to said base intermediate the ends thereof and extending away therefrom with one end of said post pointing away from said base and a pair of traction blade portions fixed relative to said base on opposite sides respectively of said post, and extending substantially in opposite directions relative to each other towards the ends of the base, and generally unsymmetrically lengthwise of said base and having their outer ends at different distances from the ends of said elongated base.

15. A vehicle track as defined in claim 14, wherein said two traction blade portions are of different lengths to define a shorter traction blade portion and a longer traction blade portion, said traction blade is of one piece construction defining an intermediate traction blade portion joining said two traction blade portions, said intermediate traction blade portion extends transversely of said elongated base and forms angles with said shorter traction blade portion and said longer traction blade portion and said post is located in the corner defined by one of said angles.

16. A snow track for a tracked vehicle comprising at least one flexible elongated element, snow cleats having traction blades fixed to said flexible elongated element and extending transversely thereof, the dimension of the traction blades transverse of said elongated element being shorter than the width of the snow track and said traction blades being arranged unsymmetrically and in staggered relationship transversely of said elongated element and defining spaces between the traction blades lengthwise of the elongated element which are greater than the spacing between any pair of successive snow cleats.

17. A snow track as defined in claim 16, wherein said elongated snow cleats are formed into groups of a small number of consecutive snow cleats separated by a snow blade between each two successive groups, each snow blade extending transversely of said track substantially across the full width thereof.

18. A snow track as defined in claim 17, wherein the traction blades of each group are alternatively offset to one side and to the other of the track relative to the adjacent traction blades and within the confines of the lateral edges of the track.

19. A vehicle track as defined in claim 17, wherein said snow blade comprises an elongated base and an elongated angle of metal, the latter having one flange attached on said base and extending lengthwise thereof and the other flange extending away from said base and the flexible elongated element.

20. A vehicle track as defined in claim 16, wherein each snow cleat comprises a rigid elongated base fixed to said flexible elongated element transversely thereof and a traction blade fixed to and extending longitudinally of said base, said traction blade is formed of a one piece construction defining a shorter traction blade portion, a longer traction blade portion, and a pair of side thrust plate portions, said side thrust plate portions extends transversely of said elongated base at the opposite ends of the traction blade, a first ice cleat is defined by a post fixed to said base relatively centrally with respect to the length of the base, and a second ice cleat is defined by a post fixed to said base adjacent one side thrust plate portion at one of said opposite ends, and each of said first and second ice cleats has one end pointing away from said base.

21. A vehicle track as defined in claim 20, wherein said traction blade includes an intermediate traction blade portion joining said shorter traction blade portion to said longer traction blade portion, said intermediate traction blade portion extends transversely of the elongated base and said first ice cleat is located adjacent said intermediate traction blade portion whereby said first ice cleats of each of the snow cleats are aligned into a generally centrally located row longitudinally of the vehicle track and the second ice cleats of each of the snow cleats are alternatively located to one side and to the other of said row in a zig-zag pattern.

* * * * *